(12) United States Patent
Russell et al.

(10) Patent No.: US 7,190,826 B2
(45) Date of Patent: Mar. 13, 2007

(54) MEASURING THE LOCATION OF OBJECTS ARRANGED ON A SURFACE, USING MULTI-CAMERA PHOTOGRAMMETRY

(75) Inventors: Gerald S Russell, Eugene, OR (US); Don M Tucker, Eugene, OR (US); K. Jeffrey Eriksen, Portland, OR (US); Onofrio Olivieri, Eugene, OR (US)

(73) Assignee: Electrical Geodesics, Inc., Eugene, OR (US)

( * ) Notice: Subject to any disclaimer, the term of this patent is extended or adjusted under 35 U.S.C. 154(b) by 731 days.

(21) Appl. No.: 10/663,900

(22) Filed: Sep. 16, 2003

(65) Prior Publication Data

US 2005/0058336 A1 Mar. 17, 2005

(51) Int. Cl.
*G06K 9/00* (2006.01)
(52) U.S. Cl. ............... 382/154; 356/602; 356/623; 356/631
(58) Field of Classification Search ................ 452/157; 382/157, 154; 607/45; 600/382, 393; 356/602, 356/623, 631
See application file for complete search history.

(56) References Cited

U.S. PATENT DOCUMENTS

| | | | |
|---|---|---|---|
| 4,812,812 A | 3/1989 | Flowerdew et al. | |
| 4,995,395 A | 2/1991 | Ilmoniemi et al. | |
| 5,291,888 A | 3/1994 | Tucker | |
| 5,293,867 A | 3/1994 | Oommen | |
| 5,548,326 A | 8/1996 | Michael | |
| 5,745,126 A | 4/1998 | Jain et al. | |
| 5,963,664 A | 10/1999 | Kumar et al. | |
| 5,969,722 A | 10/1999 | Palm | |
| 6,084,979 A | 7/2000 | Kanade et al. | |
| 6,341,016 B1 | 1/2002 | Malione | |
| 6,480,620 B1 | 11/2002 | Sakamoto | |
| 6,926,660 B2 * | 8/2005 | Miller | 600/9 |
| 7,123,263 B2 * | 10/2006 | Harvill | 345/473 |
| 2004/0023612 A1 * | 2/2004 | Kriesel | 452/157 |

OTHER PUBLICATIONS

F. Dellaert, S. Sietz, C. Thorpe, and S. Thrun, Structure from Motion without Correspondence. IEEE Computer Society Conference on Computer Vision and Pattern Recognition ( CV.

* cited by examiner

Primary Examiner—Joseph Mancuso
Assistant Examiner—Nancy Bitar (57) ABSTRACT

A method and apparatus for measuring the location of objects arranged on a convex surface. A plurality of cameras is arranged in a stationary array about the surface, and is used to capture images of the objects. A parameterized model of the surface is developed using optimization techniques, and then the locations of the objects are established by triangulation. The method is applied to location of electrophysiological sensors on the head, for purposes of electroencephalographic source analysis, or for registration with other imaging modalities such as MRI (magnetic resonance imaging).

1 Claim, 7 Drawing Sheets

MEASURING THE LOCATION OF OBJECTS ARRANGED ON A SURFACE, USING MULTI-CAMERA PHOTOGRAMMETRY

BACKGROUND OF THE INVENTION

In order to observe the dynamic physiology of the brain, a variety of sensors are required to be arranged around the head of a human (or animal) subject. These sensors are typically electrodes for detecting the electroencephalographic signal, but the may also include optical or magnetic sensors. For accurate analysis of the sources of physiological signals, it is also necessary to obtain precise measurements of the three-dimensional spatial coordinates of the sensors, so that they may be registered with images of the head made using other modalities (such as MRI or PET). Thus, a specialized art has developed for the purpose of measuring the locations of these sensors.

In the previous art, one method uses a fixed transmitter of electromagnetic radiation, and a wand containing an electromagnetic detector which may be manually positioned at the location of each sensor in turn. The position of the wand may be evaluated by analysis of the signals received by the detecting wand. (See for example U.S. Pat. No. 4,812,812.) This method is accurate but time-consuming, and may be susceptible to artifacts caused by metal objects in the vicinity of the subject.

Another method uses an elastic cap stretched over the head, with fiduciary markings that may be used to pre-mark the head of the subject with the target locations of the sensors (U.S. Pat. No. 5,293,867). This method is also time-consuming and impractical, especially with high-density electrode systems such as the Geodesic Sensor Net (our U.S. Pat. No. 5,291,888.)

Furthermore, some very specialized means have been developed for detecting the positions of sensors in magnetoencephalograph (MEG) systems, such as U.S. Pat. No. 4,995,395. However, these means are not useful with electroencephalographic sensors, except when used in conjunction with an MEG system.

The use of stereoscopic imaging to determine the positions of objects is, in general, well known to the existing art of photogrammetry (through triangulation, for example). However, in some important respects, this existing art is inadequate to meet the needs of EEG sensor localization.

In order to measure the positions of all sensors simultaneously at one moment in time (preventing artifacts caused by motion of the subject or by motion of the sensors relative to each other) it is necessary to surround the subject with cameras, to be used to capture images simultaneously. A number of patents have previously recognized the utility of such a multiple camera structure, such as U.S. Pat. No. 5,745,126 (Jain et al) and U.S. Pat. No. 6,084,979 (Kanade et al.) These patents were aiming to develop a "virtual reality" representation of objects in space. However, they do not appear to have realized that a minimal structure necessary to completely surround a regular convex object (such as a human head) is only eleven cameras in an icosahedral gantry. This choice results in a widely spaced set of cameras (with a dihedral angle of approximately sixty degrees), leading to another set of novel problems.

In the existing art, local measures of image correlation are often used to establish the level of disparity or dihedral angle between images. However, at very large angles this becomes problematic, because the varying angles result in varying amounts of local foreshortening of the image. This foreshortening is not necessarily predictable, depending on the orientation of objects in the field of view of the cameras. Therefore, well-known methods for establishing local correlation such as found in U.S. Pat. No. 6,480,620 (Sakamoto); U.S. Pat. No. 5,963,664 (Kumar, et al); U.S. Pat. No. 5,548,326 (Michael) and so forth, are unlikely to be successful in this case. The problem is further exacerbated by the fact that these local correlation algorithms also assume a locally planar surface containing the objects under observation; in our case the shape of the head is strongly curved.

Another well-known methodology uses "structured light" to establish a set of points which may be readily identified across multiple images. These methods are described in patents such as U.S. Pat. No. 6,341,016 (Malione) and U.S. Pat. No. 5,969,722 (Palm). However, we are interested in precisely locating the centers of the sensor objects, and with a structured light system there can be no guarantee that any particular sensor will have its shape fully characterized with adequate precision. Also, it is difficult to imagine the extension of the "structured light" paradigm, into the requirement of multiple simultaneous viewpoints surrounding the head.

BRIEF SUMMARY OF THE INVENTION

Our invention is a method and apparatus for measuring the location of objects arranged on a convex surface. This method is applicable even if the objects are densely spaced in a regular array. A plurality of cameras is arranged in a stationary array about the surface, and is used to capture images of the objects. A parameterized model of the surface is developed using optimization techniques, and then the locations of the objects are established by triangulation. The method is applied to location of electrophysiological sensors on the head, for purposes of electroencephalographic source analysis, or for registration with other imaging modalities such as MRI (magnetic resonance imaging).

One objective of our invention is to facilitate the rapid and convenient acquisition of all the data necessary to localize all of the sensors in a dense-array EEG system, which was difficult or impossible using any previously known art.

Another objective of our invention was to overcome the limitations of earlier art in the field of stereoscopic image correspondence and disparity mapping. Our invention uses an algorithm that solves for a surface congruent to the shape of the head in three-dimensional space. This surface is then used as the basis for establishing correlations between the observed coordinates of the sensors.

Although our embodiment of this invention is designed specifically for the purpose of EEG electrode localization, this method and apparatus may also be applied more generally to any problem involving localization of objects or markings on a continuous curved surface.

BRIEF DESCRIPTION OF THE SEVERAL VIEWS OF THE DRAWING

Photographs are provided for FIGS. 1, 2, 4, 5, 6, and 10 (in preference to drawn figures) because of their enhanced clarity in illustrating the features of the invention.

DETAILED DESCRIPTION OF THE INVENTION

Figure 1:
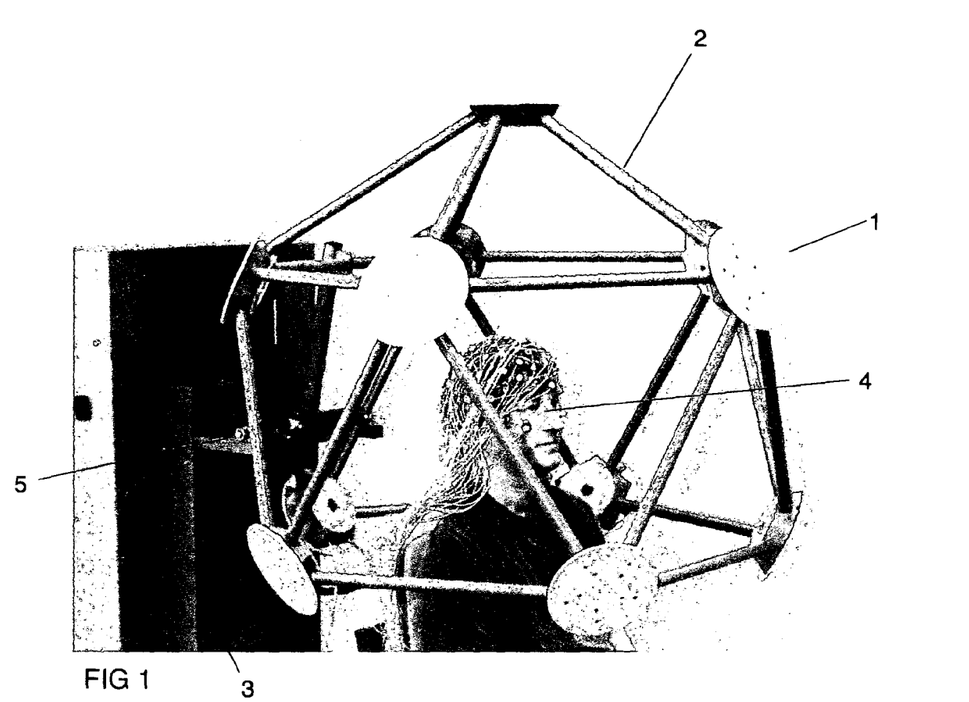
FIG. 1 depicts the multi-camera photogrammetry apparatus.
Figure 2:
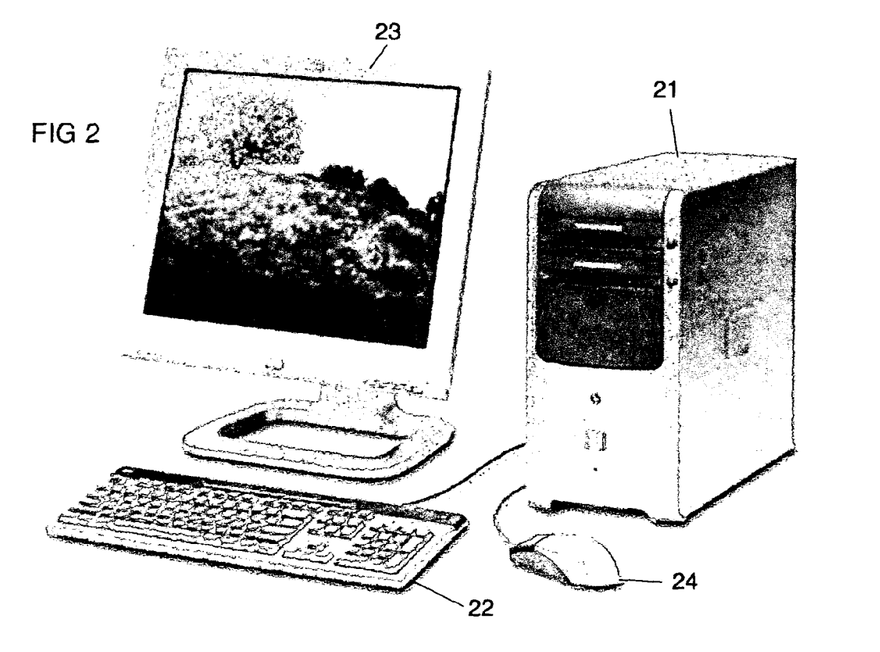
FIG. 2 shows a computing apparatus used with the multi-camera photogrammetry system.

The preferred embodiment of our multi-camera photogrammetry apparatus is shown in FIG. 1. It consists of eleven cameras 1 arranged in an icosahedral geodesic structure 2. In this figure, a rolling motorized lifting and supporting structure 3 is used to position the camera gantry over the subject 4. The gantry is supported on a pivoting rod 5, and the gantry may simply be lifted upwards to allow the subject to enter or exit the system. The eleven cameras are connected to a computing means shown in FIG. 2, with a central processing unit (CPU) 21, keyboard 22, graphical display device 23 and mouse or other pointing device 24.

Figure 3:
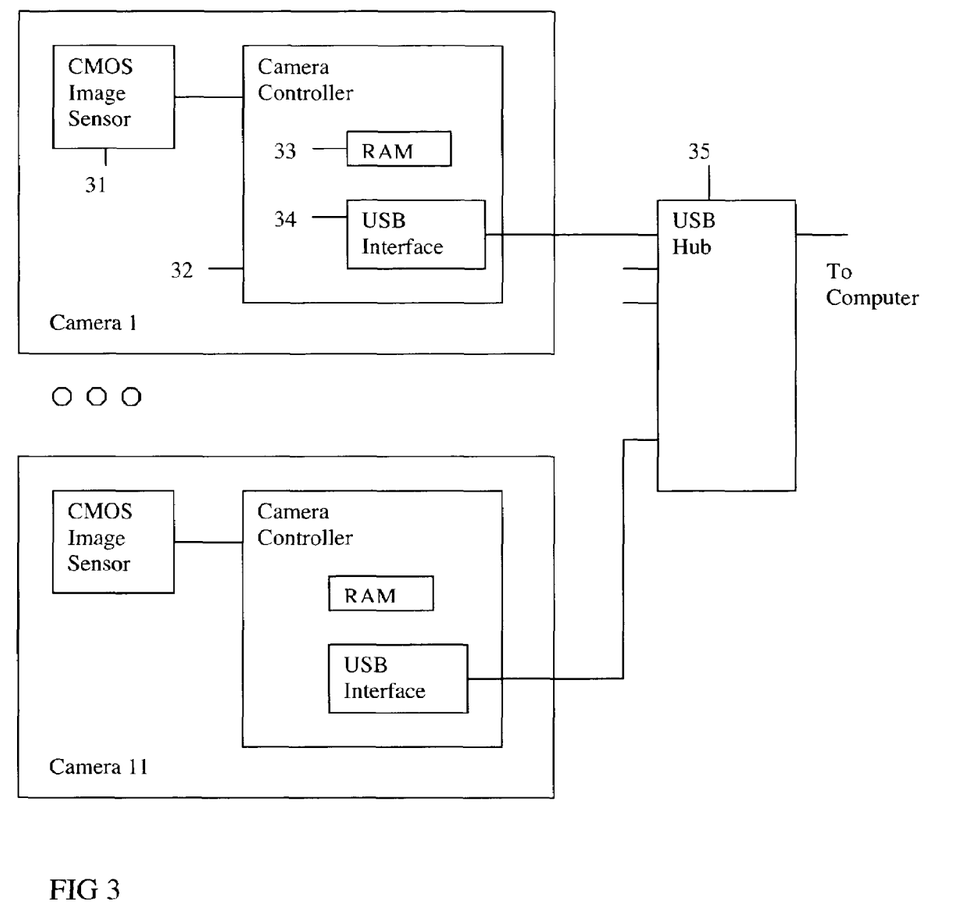
FIG. 3 is a block diagram of the camera system, showing its component parts.

The preferred embodiment for the cameras (FIG. 3) uses inexpensive 640 by 480 pixel CMOS (Complementary Metal-Oxide Semiconductor) image sensors 31 to capture the video images. The sensors are supported by controller circuits 32 incorporating a local RAM (Random Acceess Memory) interface 33 for image buffering, and a USB (Universal Serial Bus) interface 34 for image downloading. The cameras provide full-color images. A USB hub 35 with shutter control and camera identification functions, is used to interconnect the cameras and allow them to share a single USB port at the host computer. Other implementations using well-known video and computer technologies will be apparent to those skilled in the art.

Figure 4:
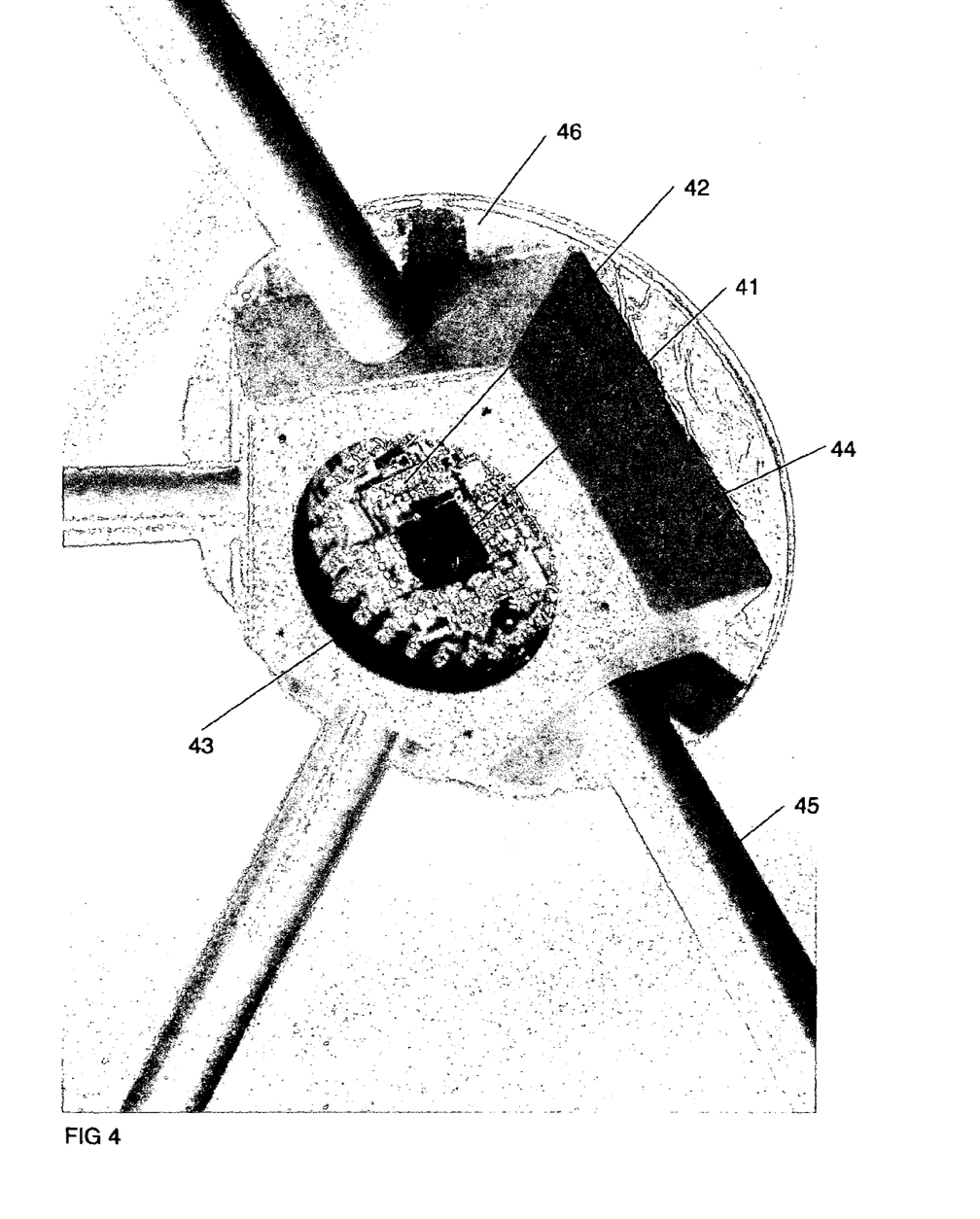
FIG. 4 is a detailed view of a camera.

The mechanical configuration of a typical camera is shown in FIG. 4. The camera sensors 41 and other components 42 are packaged, along with a ring of white LED's (Light Emitting Diodes) 43 for illumination, in pentagonal-shaped cans 44 formed from sheet aluminum. Aluminum or steel tubing 45 is used to join the cameras together into a stable geodesic structure, and the USB cables 46 are routed through the tubes to the hub, which is small enough to fit along with the camera in one of the aluminum camera mounts. The camera back panels 48 and front panels (not shown) are formed from flat plastic discs, providing a smooth, safe and attractive outer surface for the unit.

Figure 5:
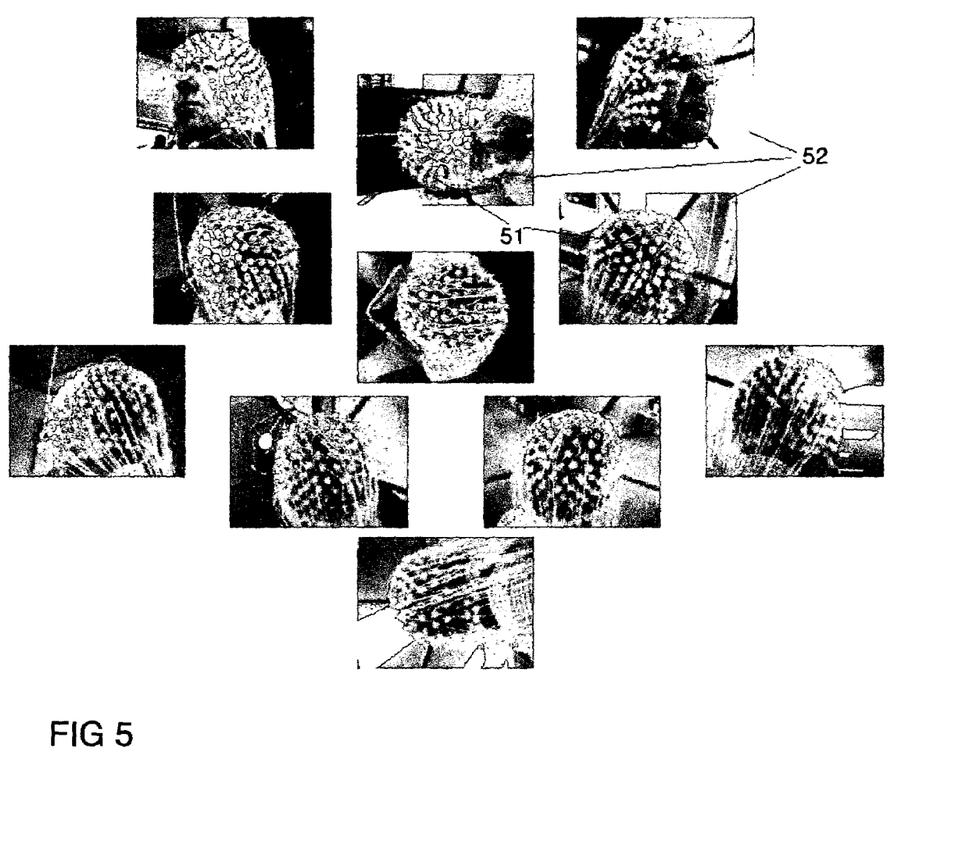
FIG. 5 shows a set of images of an EEG sensor array, as captured by the apparatus.

By means of commands issued from the computer (FIG. 2), the user may trigger the cameras to simultaneously acquire images of the Sensor Net from eleven different points of view. A typical set of images is shown in FIG. 5. Because of the geometry of the cameras, each sensor 51 will be seen in at least two images 52, allowing its position to be established very precisely through triangulation in three dimensions.

Figure 6:
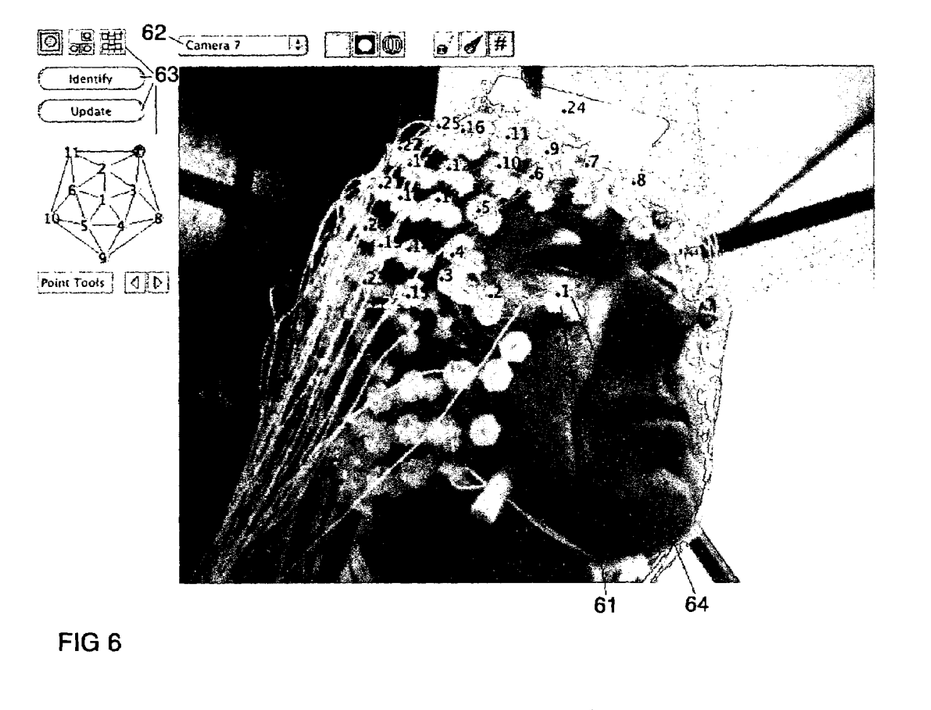
FIG. 6 illustrates the Graphical User Interface (GUI) provided for system operation.

In order to mark the coordinates of the sensors in the images, one embodiment of our invention utilizes a semi-automatic paradigm in which the user is required to mark the sensor locations on the images of the net captured by the photogrammetry system, using a graphical user interface (GUI) as shown in FIG. 6. Marking is accomplished by using a mouse or graphic pointing device. The resulting input to the program is a set of unlabeled X-Y coordinate pairs in image coordinates, representing each sensor 61. The user interface also includes a camera selection means 62 and other functional controls 63. Each sensor is identified by a numeric label 64. However, the numeric label does not necessarily correspond with the correct label for the sensor at this point.

Figure 7:
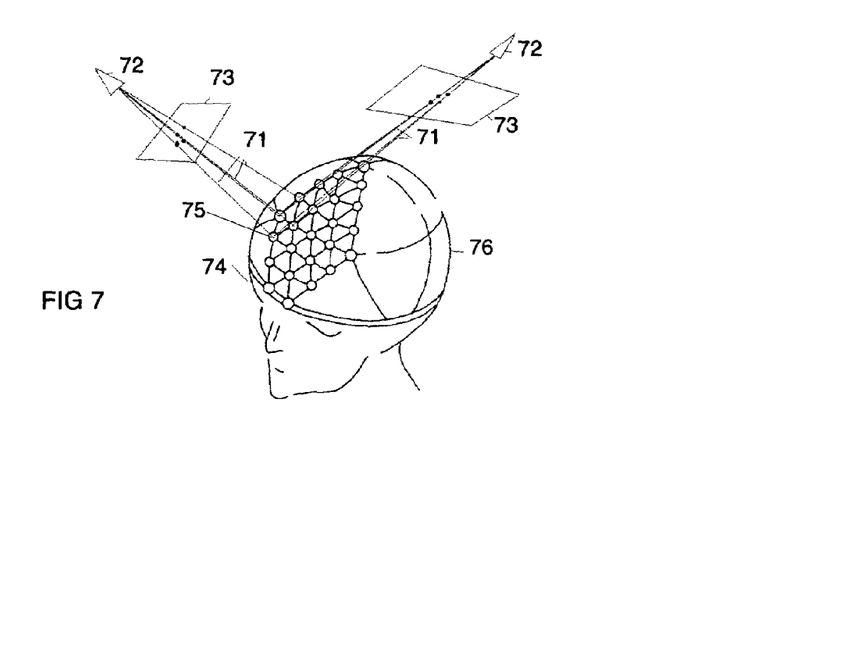
FIG. 7 shows the method of solving for correspondences between sensor images.
Figure 8:
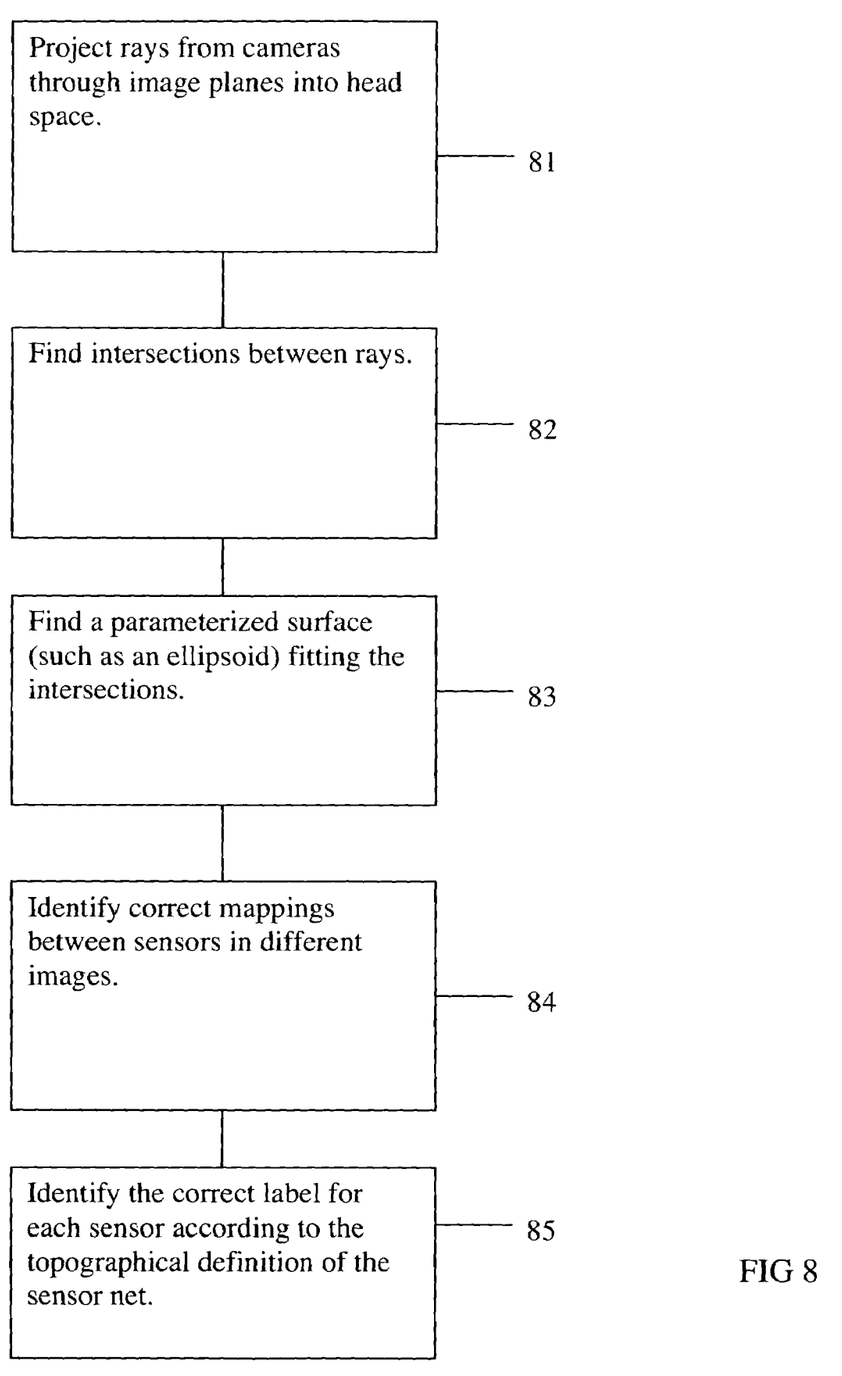
FIG. 8 is a flow-chart of the software algorithm.

The method of solving for the correspondences between the various sensor images, and for solving the sensor locations and identifications, is illustrated schematically in FIG. 7, and the steps of the algorithm are illustrated in flow-chart form in FIG. 8. The first step (81) is to project a set of rays 71 from the camera locations 72, through the coordinate pairs in the unit image plane 73, and into the space occupied by the head 74. The rays are defined in parametric form by their origins (at the cameras) and by their direction cosines. Each sensor is located at the intersection 75 of the rays associated with the images of that sensor in the various cameras that have a view of that sensor. In general, these intersections are never exact, because the X-Y coordinate pair location data is slightly noisy. (Human operators can typically achieve average errors of just over a pixel, with occasional errors of several pixels.)

As an example of the circumstances relating to our preferred embodiment: a typical electrophysiological sensor net might consist of 256 sensors, with each sensor visible in anywhere from 2 to 5 cameras, resulting in a total of around 1000 sensor views in the 11 cameras. Thus we find that we have over 200,000 possible pairings of rays between adjacent cameras. Most of these pairings do not intersect, but a very large number of spurious intersections 76 do occur, within the tolerances of error in the X-Y coordinate data. In a typical dataset, as many as 5000 pairings represent statistically plausible intersection points, depending on the tolerances achieved by the camera calibration and in the sensor marking process. The problem is to determine which of these associations are correctly mapped together onto a true sensor location, and to determine the correct identification labels for the sensors with respect to the topographical specification of the sensor map.

As the next step (82) in our preferred embodiment, we solve for the locations in 3D space of all of these intersections. Each of the intersections may also be assigned a probability or weight based on the closeness of the intersection. In order to find the net from within this point cloud, we use an optimization algorithm 83 (such as the Nelder-Mead simplex algorithm) to find a best-fit ellipsoid shape 76; that is, the shape which minimizes the (weighted) expected distance from the points in the point cloud, to the surface of the model shape. This is possible because, to a first (very crude) approximation, the shape of the head is characteristically ellipsoid; and because the spurious intersections in the point cloud tend to be distributed randomly about the true locations of the sensors.

The ellipsoid is a mathematically simple form for a general parameterized surface, defined by six parameters: the center coordinates, and the three cord lengths. Other more complex forms such as cubic splines or spherical harmonic shapes might also be used.

Once an approximate ellipsoid has been fit, it is possible to make an initial estimate of the true location of the sensor associated with each observed ray, by finding the point of intersection of each ray with the ellipsoid surface. The observations may then be grouped into clusters based on their estimated locations.

A discussion of the correspondence problem may be found in: F. Dellaert, S. Seitz, C. Thorpe, and S. Thrun. Structure from Motion without Correspondence. IEEE Computer Society Conference on Computer Vision and Pattern Recognition (CVPR'00), June, 2000. However, unlike their method, we make use of surface shape information to define the clusters of corresponding observations.

We may also define a function for each cluster, to measure the quality of fit of the surface with respect to the cluster. For each observation in the cluster, we find its closest neighbor and calculate the squared distance to that neighbor, based on the estimated locations of the intersections of the rays with the parameterized surface. This quantity is summed over all of the observations in the cluster. When the parameterized surface is close to the actual surface shape defined by the sensor locations and the head, then each of the estimated locations will be very close to the true location of its associated sensor, and to the intersections of the other rays correctly associated with that sensor. Thus, the squared-distance function is minimized as the parameterized surface conforms to the actual shape of the head. This defines an alternative objective function, which may also be optimized at step 83 to refine the estimate of the head shape surface. This may result in improved estimates for the surface location, as well as the location of the sensor associated with each observed ray. We note that if the ray associated with a sensor image is approximately normal to the surface, then the accuracy of the location estimate will be better than if the ray is more tangential.

This surface plays a role very similar to an iso-disparity surface in conventional stereography. Once the surface is found, then small deviations from the surface will be manifested in terms of small variations in vergence, compared to the expected vergence at that location on the surface.

A conventional technique in stereography is to slide the image pairs across each other, looking for high correlations between the images at the point where the introduced offset is equal to the disparity between the images in the iso-disparity plane. This would not be a useful technique with our images. The distance between cameras is much larger than typically used for stereo vision systems, which would cause a large difference in perspective and rotation between adjacent images, preventing high correlations from occurring. Furthermore, because of the high degree of curvature around the head surface, the concept of an iso-disparity plane would only be relevant over very small areas.

With respect to our extended conception of a parameterized variable-disparity object surface, our squared-distance function can be seen as analogous to the correlation function in conventional stereography.

Interestingly, if the curvature and orientation of the parameterized surface is approximately correct, we find that there may be several peaks and valleys of the function value as we scan the surface through space in a direction normal to the surface. This occurs because the sensor net is structured as a regular lattice. When the parameterized surface is in the "correct" location (that is, the global minimum of the squared-distance function), then the rays associated with the projections of the various sensors all intersect with each other, within or near the surface. When the surface is at one of the local minima of the function, then we find that each of the rays through the sensors as viewed from one of the cameras, is intersecting with the ray of an adjacent sensor in the lattice, viewed from another camera. The misalignment is repeated for many sensors across the lattice.

The next step 84 is to determine a set of mappings between the observations, and therefore a set of sensor locations, which must conform to all of the known constraints. These constraints are: (1) The number of sensors must be the same as the known number of sensors in the physical net; (2) each sensor must be located at a position consistent with the estimates derived from the intersections of its projected rays with the surface; (3) the mean square of the distances between the rays, at their closest (approximate) intersections within each group of observations which is mapped to a single sensor, must be minimized. The solution may be found either by a greedy algorithm which seeks to find a sequence of mappings consistent with these constraints, or by using a Metropolis-type Markov Chain Monte Carlo algorithm to generate and test a large set of possible mappings, evaluating and accepting or rejecting each mapping according to its conformance with the constraints. In most cases, if the surface is fit correctly, then the clusters of intersections of sensor image rays with the surface will be quite distinct and highly correlated with the location of the closest intersection of the rays, so the association of the rays as images of the same sensor is relatively trivial and can easily be accomplished by a greedy algorithm. However, some rays tangential to the surface may be weakly associated with several possible sensor identifications, and a statistical sampling method may be more appropriate to assess the probabilities of the different mapping possibilities.

A final step 85 is to associate each sensor with its correct label according to the topographical definition of the sensor net. To carry out this operation (illustrated in FIG. 9), first we must identify one or more of the "cardinal points" 91 among the set of located sensors 92. The Geodesic Sensor Net topography is defined in terms of an icosahedron, and the cardinal points are the vertices of this icosahedron. There is a sensor located at each cardinal point, while the rest of the sensors in the net are arrayed in a regular lattice structure between these points. In general, the sensor net is a hexagonal lattice and each sensor has six neighbors. However, the sensors at the cardinal points have only five neighbors. This constitutes a reasonably reliable mechanism for identifying these sensors. The cardinal sensors may also be identified by using colored markings 93 on the sensors.

Figure 9:
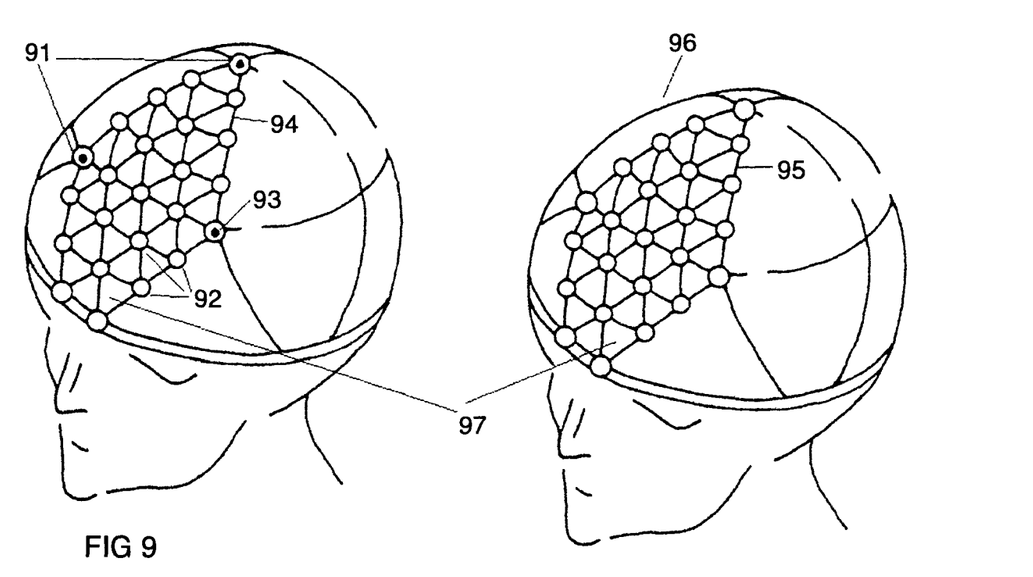
FIG. 9 shows the method of assigning sensor identifications.

All of the located sensors are projected onto a sphere, and a Delaunay triangulation 94 is extracted to identify their topographical relationships. A similar triangulation 95 is used to define the structure of an idealized net 96 defined in accordance with engineering drawings, and the sensors from the photogrammetry localization process are labeled so as to establish a one-to-one correspondence 97 between the two triangulations, given the mappings between cardinal points as "seed" correspondences.

This entire process depends on accurate calibration of the camera system, so that the rays associated with each sensor image can be projected precisely into space, and locations may be triangulated accurately. We use a linear camera model defined by 11 parameters: camera location (3 parameters), orientation (3 parameters), focal length (1 parameter), pixel scale (1 parameter), pixel aspect ratio (1 parameter), and image plane center offset (2 parameters). These parameters may be used to define a projection operator for each camera, which maps from a three-dimensional point in space to a two-dimensional location in the camera image.

Figure 10:
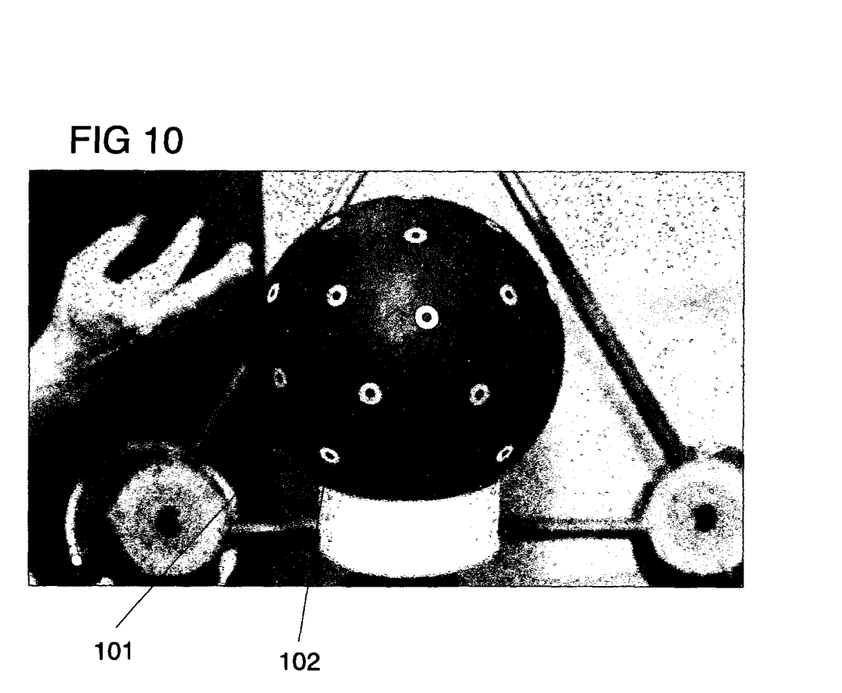
FIG. 10 depicts the photogrammetry calibration object.

The preferred calibration apparatus (FIG. 10) uses a spherical object 101 of known dimension. Labels 102 may be placed as targets around this object at known positions, and the calibration object may then be placed at a specific location at the center of the camera dome. The calibration procedure involves an optimization of the camera parameters so as to place all of the calibration points on a spherical surface of the correct radius and at their correct locations, while maintaining high convergence between intersecting rays corresponding with each of the calibration target labels.

We claim:

1. A method for measuring the location of densely spaced electrophysiological electrodes arranged on the head surface of a human subject, said method comprising:
   a) forming two-dimensional images of the scene using cameras located at each of the vertices of a regular icosahedral gantry structure surrounding the electrophysiological electrodes;
   b) measuring the two-dimensional coordinates of the object within each image;
   c) projecting rays from camera locations towards the two-dimensional coordinates of the object;
   d) creating an ellipsoidal parameterized surface fitting the intersections between the projected rays;
   e) establishing the correct object mapping between electrodes in different images with respect to the proximity of the parameterized surface;
   f) calculating the exact three-dimensional coordinates of the objects using triangulation based on optimizing the parameterized surface and the object mapping.

* * * * *